(12) United States Patent
Nakajima (10) Patent No.: US 8,578,619 B2
(45) Date of Patent: Nov. 12, 2013

(54) SHAPE MEASURING APPARATUS AND SHAPE MEASURING METHOD

(75) Inventor: Ryusuke Nakajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

(21) Appl. No.: 13/361,819

(22) Filed: Jan. 30, 2012

(65) Prior Publication Data

US 2012/0204435 A1    Aug. 16, 2012

(30) Foreign Application Priority Data

Feb. 14, 2011    (JP) .................................. 2011-028716

(51) Int. Cl.
*G01B 5/008*    (2006.01)

(52) U.S. Cl.
USPC .................................. 33/503; 33/556; 33/559

(58) Field of Classification Search
USPC ............ 33/553, 556, 557, 558, 559, 560, 561
See application file for complete search history.

(56) References Cited

U.S. PATENT DOCUMENTS

| | | | |
|---|---|---|---|
| 4,817,362 A * | 4/1989 | Archer | 33/832 |
| 6,718,647 B2 * | 4/2004 | Trull et al. | 33/558 |
| 7,347,000 B2 * | 3/2008 | Jordil et al. | 33/561 |
| 7,441,341 B2 * | 10/2008 | Eaton | 33/503 |
| 8,302,322 B2 * | 11/2012 | Yasuno et al. | 33/556 |
| 2002/0104227 A1 * | 8/2002 | Trull et al. | 33/558 |
| 2004/0040373 A1 * | 3/2004 | Saito | 33/558 |
| 2005/0278969 A1 * | 12/2005 | Jordil et al. | 33/559 |
| 2007/0163134 A1 * | 7/2007 | Eaton | 33/502 |
| 2011/0056085 A1 * | 3/2011 | Jordil | 33/503 |
| 2011/0083335 A1 * | 4/2011 | Yasuno et al. | 33/556 |
| 2012/0158359 A1 * | 6/2012 | Nakajima | 702/168 |
| 2012/0204435 A1 * | 8/2012 | Nakajima | 33/503 |
| 2013/0139397 A1 * | 6/2013 | Jordil et al. | 33/503 |

FOREIGN PATENT DOCUMENTS

JP    2005-037197 A    2/2005

* cited by examiner

*Primary Examiner* — Yaritza Guadalupe-McCall
(74) *Attorney, Agent, or Firm* — Canon U.S.A., Inc., IP Division (57) ABSTRACT

A contact type prove achieves a high-precision measurement of a shape of even a steeply-inclined surface in the vicinity of vertical by controlling a contact force stably. In a shape measuring method for measuring the shape of the surface of a measured object by moving a contact type probe along the surface of the measured object, a slope of the measured object surface is estimated depending on the magnitude of a component force of the contact force applied to the probe and when it is determined that the slope is in the vicinity of vertical, a probe supporting unit is moved in a direction perpendicular to the moving direction of the probe supporting unit.

5 Claims, 5 Drawing Sheets

SHAPE MEASURING APPARATUS AND SHAPE MEASURING METHOD

BACKGROUND OF THE INVENTION

1. Field of the Invention

The present invention relates to a shape measuring apparatus having a stylus type probe capable of measuring a surface shape of an optical element such as a lens and a mirror, and a mold for manufacturing the optical device at a high precision on the order of nanometer, and a shape measuring method thereof. More particularly, the present invention relates to a shape measuring apparatus capable of coping with measurement of a shape having a steep inclination angle, for example, a shear wall surface rising vertical from horizontal.

2. Description of the Related Art

Generally, as a shape measuring method for measuring coordinates or a shape of a specific portion of the surface of a measured object having a 3-dimensional shape, a measuring method using the stylus referred to as probe has been known. According to this measuring method, the probe is allowed to trace the surface of the measured object while pressed against the surface of the measured object at a predetermined contact force, so that, by measuring a position of the probe with respect to a predetermined origin and an orientation of the probe, the shape of the measured object is measured.

Conventionally, as regards such a shape measuring method, a contact type probe based on a shape measuring method as discussed in Japanese Patent Application Laid-Open No. 2005-37197 has been known to those skilled in the art. According to this method, a stylus probe is used to measure the shape of a measured object, the probe being supported with a leaf spring suspended from a housing. The probe is provided with a displacement sensor capable of measuring a relative position of the probe with respect to the housing. Based on these sensors and preliminarily measured stiffness (spring constant) in each direction of the suspended leaf spring, a contact force can be measured based on a displacement generated when the probe comes into contact with the measured object. By synthesizing obtained contact forces Fx, Fy, Fz of respective directions, a normal force acting against the probe from the measured object can be estimated. The probe is allowed to trace a profile of the measured object with the magnitude of a contact force F (normal force) of the probe kept constant to measure the shape. Thus, according to the shape measuring method discussed in Japanese Patent Application Laid-Open No. 2005-37197, even if the measured object has a steeply-inclined surface, its shape can be measured with the contact force applied from the probe to the measured object kept constant. Accordingly, the shape can be measured while generation of a system error accompanying an increase and decrease in the contact force during the measurement depending on the inclination of the measured object surface is reduced.

However, according to the method discussed in Japanese Patent Application Laid-Open No. 2005-37197, the housing is moved in the horizontal direction along a fixed scanning track to scan the probe, and the housing driven by a servo motor is displaced in the vertical direction. Consequently, a contact force F (normal force) applied to the probe can be controlled. Thus, when the measured object surface has a steep slope, for example, a vertical surface, namely when the displacement direction of the housing for controlling the force is substantially parallel to the tangent line of the slope of the measured object, the contact force to the measured object changes little even if the housing is displaced in the vertical direction, thereby making it difficult to control the contact force.

When the probe is moved in the horizontal direction along the scanning track and the probe comes into contact with the vertical surface of the measured object, of a force S urged against the probe by a movement of the housing, a component force St in the direction of the tangent to the measured object is so small that the probe cannot move, thereby making it difficult to scan the probe along the profile of the measured object.

Therefore, when the probe is kept in contact with a steep surface, for example, a vertical surface while controlling the contact force F applied to the probe by displacing the housing in the vertical direction, it is difficult to allow the probe tracing the profile of the measured object, thereby making it difficult to measure the shape.

SUMMARY OF THE INVENTION

The present invention is directed to a shape measuring apparatus and method capable of measuring a shape of a measured object having a steeply-inclined surface like a vertical plane while controlling a contact force F applied to a probe by displacing a probe supporting unit configured to support the probe, in a vertical direction.

According to an aspect of the present invention, a shape measuring apparatus for measuring a shape of a measured object by scanning a contact type probe along the surface of the measured object while keeping the contact type probe in contact with the measured object and measuring a position of the contact type probe, comprises: a probe supporting unit movable in a 3-dimensional direction; a contact type probe supported elastically with respect to the probe supporting unit; a measured unit configured to measure the position and orientation of the contact type probe; and a calculation unit configured to calculate a contact force received by the contact type probe from the measured object based on a measured position and orientation of the contact type probe, wherein, the probe supporting unit is configured, when a component force containing a component in a moving direction of the probe supporting unit of the contact force exceeds a predetermined threshold, to be driven in a direction perpendicular to the moving direction of the probe supporting unit to move the contact type probe.

According to another aspect of the present invention, a shape measuring method for measuring the shape of a measured object by scanning a contact type probe supported elastically by a probe supporting unit movable in a 3-dimensional direction along the surface of the measured object while keeping the contact type probe in contact with the measured object and measuring a position of the contact type probe, comprises: measuring the position and orientation of the contact type probe and calculating a contact force based on the measured position and orientation of the contact type probe; scanning the surface of the measured object with the contact type probe by moving the probe supporting unit while controlling the contact force to approach a target value with a force control unit; and driving the probe supporting unit in a direction perpendicular to the moving direction of the probe supporting unit to move the contact type probe, when a component force containing a component in a moving direction of the probe supporting unit of the contact force exceeds a predetermined threshold.

According to the present invention of this application, the probe supporting unit is driven in a direction perpendicular to a moving direction of the probe supporting unit based on a contact force applied to the probe and the magnitude of a component in a moving direction of the probe supporting unit. Consequently, the probe can be allowed to trace the surface of a measured object even if the measured object has a steeply-inclined surface. Therefore, the shape of even a measured object having a vertical plane can be measured.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
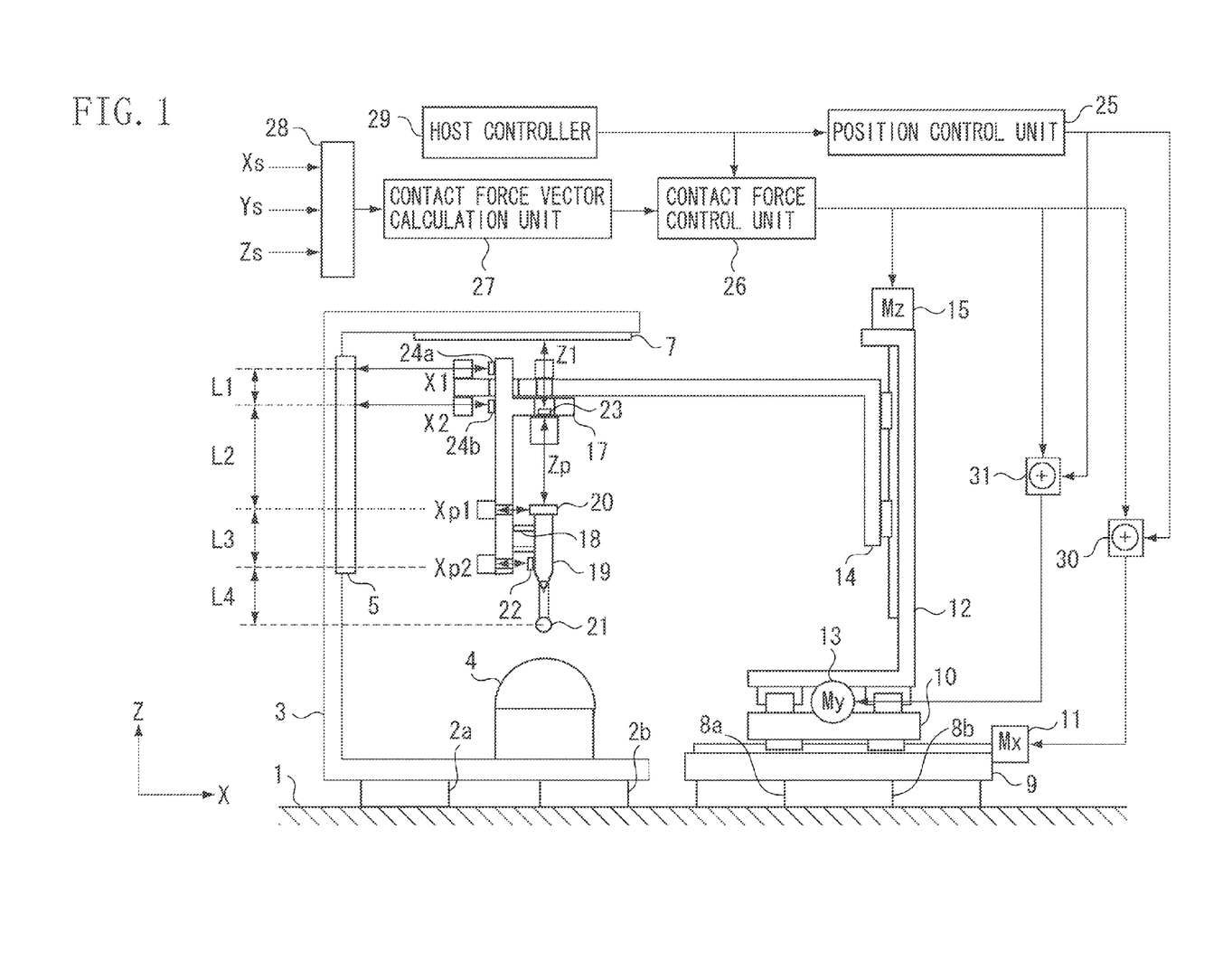
FIG. 1 is a configuration diagram of a probe according to a first exemplary embodiment of the present invention.

A first exemplary embodiment will be described below. FIG. 1 illustrates a first exemplary embodiment, indicating the features of the present invention in detail. Referring to FIG. 1, a shape measuring apparatus is installed on the floor. Vibration control bases 2a, 2b are placed on the floor 1 and a measuring base 3 is provided thereon. The vibration control bases can attenuate vibration transmitted from the floor 1 to the measuring base. This measuring base is used for fixing a measured object 4 and three reference mirrors, and then, this shape measuring apparatus measures the position of a point on the surface of the measured object with respect to these reference mirrors.

The measuring base 3 is a box-shaped construction, in which the measured object 4 is to be fixed. Further, the measuring base 3 has an X-reference mirror 5 serving as a position reference in the horizontal direction, a Y-reference mirror (not shown) and a Z-reference mirror 7 serving as a position reference in the vertical direction. The measuring base and the reference mirrors serve as a criterion for measurement and are manufactured with a material having a small coefficient of linear thermal expansion, for example, a low thermal expansion ceramic, low thermal expansion casting iron, low thermal expansion glass. These reference mirrors serve as position criteria when measuring a distance with a laser measuring machine.

A slide configured to move the probe will be described. Vibration control bases 8a, 8b are installed on the floor 1 and a scan-axis base 9 is provided thereon. With the scan axis base 9 as a fixing unit, an X-axis slide 10 movable relatively in the X-direction in the same Figure and an X-axis motor 11 are provided on the scan-axis base 9. A Y-axis slide movable relatively in the Y-direction with respect to the X-axis slide 10 and a Y-axis motor 13 are provided on the X-axis slide 10. Likewise, a Z-axis slide 14 movable relatively in the Z axis with respect to the Y-axis motor 12 and a Z-axis motor 15 are provided on the Y-axis slide 12.

With this structure, the Z-axis slide 14 is movable 3-dimensionally in the X, Y, and Z directions. A probe supporting unit 17 is fixed on the Z-axis slide 14 and a probe shaft 19 is supported by a leaf spring 18 suspended from the probe supporting unit 17. The leaf spring 18 is constructed of one or a plurality of thin metal plates, and although the leaf spring 18 is represented here in a structure of a cantilever beam in FIG. 2, it may be formed in a double end beam. To secure stability to heat, the probe shaft 19 is manufactured of a material having a small coefficient of linear thermal expansion, for example, low thermal expansion ceramic, low thermal expansion casting iron, low thermal expansion glass. The probe shaft 19 has a three-sided mirror having a mirror surface each in the Z direction, X direction and Y direction at its top end, and a tip ball 21 which comes into contact with the measured object 4 at its bottom end.

As described above, the probe supporting unit 17 is fixed on the X-axis slide, the Y-axis slide and the Z-axis slide, so that the probe supporting unit 17 is configured to be movable 3-dimensionally. A contact type probe consisted of the probe shaft 19 and the tip ball 21 is supported elastically with respect to this probe supporting unit.

A probe small mirror 22 configured to measure a displacement in the X direction and the Y direction and is provided on the probe shaft 19 such that it is spaced from the three-sided mirror 20. On the other hand, the probe supporting unit 17 is provided with an interferometer configured to measure a displacement of the three-sided mirror 20 to measure a position and orientation of the probe. The interferometers include an interferometer Xp1 configured to measure a displacement in the X direction, and similarly include an interferometer Yp1 configured to measure a displacement in the Y direction and an interferometer Zp configured to measure a displacement in the Z direction (which are not shown). To measure a distance to the probe small mirror 22, an interferometer Xp2 configured to measure a displacement in the X direction is provided and, likewise, an interferometer Yp2 configured to measure a displacement in the Y direction is provided on the probe supporting unit 17 (which are not shown). A Z-direction distance measurement small mirror 23 is provide on the probe supporting unit 17 and a Z-axis interferometer Z1 is provided to measure a distance to the Z-reference mirror 7. The Z-axis interferometer Z1 and the interferometer Zp are disposed such that measurement axes thereof pass through the axis of the probe and the center of the tip ball 21.

To measure a distance between the X-reference mirror 5 and the probe supporting unit 17 at two positions, X-distance measurement small mirrors 24a, 24b are provided on the probe supporting unit 17. X-axis interferometers X1, X2 configured to measure these distances are provided on the Z-axis slide 14. As for the Y direction, Y-axis interferometers Y1, Y2 are provided on the Z-axis slide 14, although not shown. For these interferometers, a distance measured by a laser measuring machine is expressed with the same symbol as the interferometer. For example, a distance measured by the interferometer X1 is expressed as X1.

Intervals in the Z direction for installing the interferometer in each of the X and Y directions are expressed with following symbols.

L1: interval between the interferometers X1 and X2 (same as an interval between interferometers Y1 and Y2 (not shown))

L2: interval between the interferometers X2 and Xp1 (same as an interval between interferometers Y2 and Yp1 (not shown))

L3: interval between the interferometers Xp1 and Xp2 (same as interferometers Yp1 and Yp2 (not shown))

L4: interval between the interferometer Xp2 and the central position of the probe tip ball 21 (same as an interval between an interferometer Yp2 (not shown) and the tip ball 21)

Using measured five distances Xp1, Xp2, Yp1, Yp2, Zp between the probe supporting unit 17 and each mirror provided on the probe, central positions Xs, Ys, Zs of the tip ball 21 and rotation angles Xm, Ym of the probe shaft with respect to the vertical direction are calculated by a probe position and orientation calculation unit 28 according to following equations.

In the following equations, it is assumed that Xp1, Xp2, Yp1, Yp2, Zp indicate distances measured by each interferometer and indicated with arrows in FIG. 1.

$$Xs = Xp1 + (Xp2 - Xp1) \times (L3 + L4)/L3 \quad \text{(equation 1)}$$

$$Ys = Yp1 + (Yp2 - Yp1) \times (L3 + L4)/L3 \quad \text{(equation 2)}$$

$$Zs = -Zp \quad \text{(equation 3)}$$

$$Xm = (Xp2 - Xp1)/L3 \quad \text{(equation 4)}$$

$$Ym = (Yp2 - Yp1)/L3 \quad \text{(equation 5)}$$

These symbols are determined depending on an installation direction of the interferometer and how to set up the coordinates. A measuring unit for measuring the position and orientation of the above-described contact type probe is constituted by each mirror and each interferometer.

$Xm$ represents a ratio of $(Xp2-Xp1)$ indicating a position of the interferometer Xp2 relative to a position of the interferometer Xp1, with respect to the length L3, and indicates a tangent $\tan(Xm)$ of an inclination angle $Xm$ of the probe shaft with respect to the vertical direction. In this case, $Xm$ is a very small value and thus it is permissible that $\tan(Xm) \approx Xm$. Thus, assuming that a length of the probe shaft supported by the probe supporting unit from its rotation center to the tip ball 21 is L, a displacement $\delta x$ in the X direction of the tip ball 21 which occurs when an external force is applied to the tip ball 21 is $L \times Xm$.

The rotation center of the probe can be obtained by previously measuring which position of the probe shaft is stationary with respect to an external force on a condition that the contact type probe is supported elastically on the probe supporting unit and then an external force is applied to the probe shaft and the tip ball 21. Thus, using $\delta_x$, $\delta_y$, $\delta_z$ and preliminarily obtained probe stiffness Kx, Ky, Kz, the probe contact force F is calculated by the contact force vector calculation unit 27 as follows:

$$F = ((Kx \times \delta_x)^2 + (Ky \times \delta_y)^2 + (Kz \times \delta_z)^2)^{1/2} \quad \text{(equation 6)}$$

The operation of the X-axis motor 11 is controlled by a contact force control unit 26 to bring the contact force F close to a predetermined target value Ft to keep the F as constant as possible to drive the X-axis slide 10. The Y axis and the Z axis are also controlled in the same way. This is called contact force control.

By scanning the probe while performing the contact force control, the position of the tip ball 21 of the probe tracing the surface of the measured object 4 can be obtained. If assuming that the rotation center of the probe never changes during the contact, the probe small mirror 22 may be omitted and make Xp2 and Yp2 zero. Assume that L3 and L4 are distances from the rotation center of the probe up to Xp1 and the probe small mirror 22. Consequently, only by measuring a displacement of the three-sided mirror 20, the probe contact force F and the position of the tip ball 21 can be obtained easily.

When scanning the probe, a scanning trajectory like, for example, a raster trajectory, is provided to an X-Y plane by a host controller 29 to move the X-axis slide 10 and the Y-axis slide 12. In this case, the X axis and the Y axis are controlled by moving those slides to a desired position with motors driven by a position control unit 25. The Z-axis slide 14 is moved by only an action by the contact force control for controlling F to be constant. Therefore, to scan the probe while controlling F constant, an instruction by the position control and an instruction by the contact force control are added to the X axis and the Y axis by an X-axis direction movement amount calculation unit 30 and a Y-axis direction movement amount calculation unit 31, respectively. Then, the X axis and the Y axis undergo the contact force control and the position control at the same time to execute the scanning operation.

Figure 4:
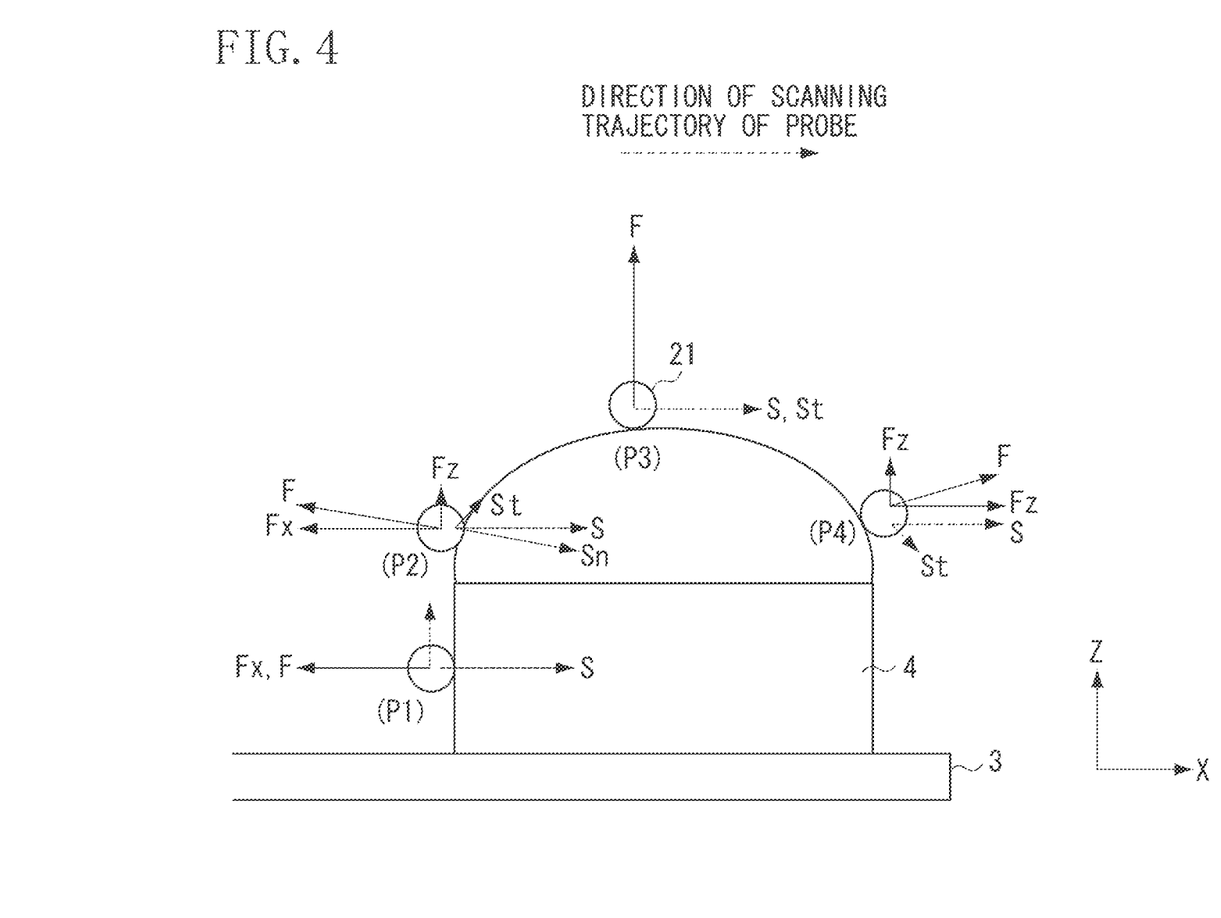
FIG. 4 is a schematic diagram illustrating the relationship between a contact force, its component forces and a trajectory direction of the probe depending on position of a measured object and a tip ball.

FIG. 4 is a schematic diagram illustrating the relationship between a contact force F, its component forces Fx and the trajectory direction of the probe depending on position of the measured object 4 having a steeply-inclined surface and the probe tip ball 21. This relationship will be described with reference to FIG. 4. The probe shaft is omitted from the same Figure to make the representation easy to understand.

When the measured object 4 has a surface having a high inclination angle (e.g., vertical) with respect to the X-Y plane like a case where the tip ball 21 is located at a position P1 in FIG. 4 and it is intended to measure the inclined surface, the surface normal of the measured object 4 and the probe scanning trajectory become parallel while the directions thereof are opposite to each other when scanning the probe. In this case, when the position control and the contact force control are implemented, the contact force F and a force S generated for the position control in the scanning trajectory direction cancel each other out when they are added, thereby disabling scanning the probe on the measured object at the position P1 in a positive direction of the Z axis, indicated with a broken line, which the tip ball 21 should move.

Even if the surface normal of the measured object 4 and the scanning trajectory are not completely parallel to each other, if they are in the vicinity of parallel to each other as seen at a position P2 in FIG. 4, when the position control and the contact force control are added, an operation amount generated by a force St (component force of the force S in a tangent direction with respect to the measured object 4) applied in the tangent direction of the measured object 4, which the probe should move, becomes remarkably small, thereby possibly disabling the probe for scanning.

On the other hand, when the probe moves downward on a steeply-inclined surface along the scanning trajectory of the probe as indicated at a position P4 in FIG. 4, it is difficult to scan the probe. When the probe moves downward along the steeply inclined surface, the force St which the tip ball 21 applies in the tangent direction of the measured object 4 becomes very small with respect to the force S. In such a case, there is a possibility that the probe may float with respect to the measured object, thereby possibly disabling continuing of measuring of the shape of the measured object 4 with the contact force F maintained at a particular value. To solve such a difficulty, according to this exemplary embodiment, component forces Fx, Fy within the X-Y plane of the contact force F or a resultant force Fxy thereof is calculated to monitor a state of the contact force control.

In this case, Fxy is calculated by the contact force vector calculation unit according to:

$$Fxy = ((Kx \times \delta_x)^2 + (Ky \times \delta_y)^2)^{1/2} \quad \text{(equation 7)}$$

A case where any one of target values of Fx and Fy is 0 is equivalent to performing a following control with any one of Fx and Fy in Fxy. Therefore, by taking a case of controlling Fxy containing both cases as an example, the shape measuring method of this exemplary embodiment will be described. As Fxy, which is XY component of the contact force F, increases and approaches the value of F, the position control is disturbed along with cancelling out by the contact force control. Then, for Fxy, a threshold Thxy is determined with respect to the contact force F and by providing the Z axis with a velocity Vz in a direction perpendicular to the probe supporting unit (positive direction of the Z axis in this exemplary embodiment), which is proportional to a force exceeding the threshold, the probe is moved upward and the scanning is continued. The threshold Thxy is determined to be, for example, 0.8 times a target value of the contact force F in the contact force control. Assuming the proportionality coefficient to be a, Vz is calculated as follows:

$$Vz = (Fxy - Thxy) \times a \quad \text{(equation 8)}$$

As a result, when moving the probe in a direction perpendicular to the moving direction of the probe supporting unit, the probe can be prevented from being pressed against the measured object strongly or conversely, leaving far from the measured object. In this case, an acceleration Az may be provided to the Z axis instead of the velocity Vz and the probe supporting unit is driven in a direction perpendicular to the moving direction of the probe supporting unit to displace the contact type probe. If the magnitude of the contact force F is already known, Thxy may be determined without relating this to the contact force F.

When a command dispatched in terms of the position control is appropriate, a position proportional to an integrated value of a difference between the threshold Thxy and a calculated component force Fxy may be provided. As a result, the scanning can be executed while preventing the contact force control and the position control from cancelling out each other. Thus, even if the measured object has a steeply inclined surface in the vicinity of vertical, the probe can be provided with a driving force along the inclined surface appropriately, thereby enabling the measurement of the shape.

Figure 3A:
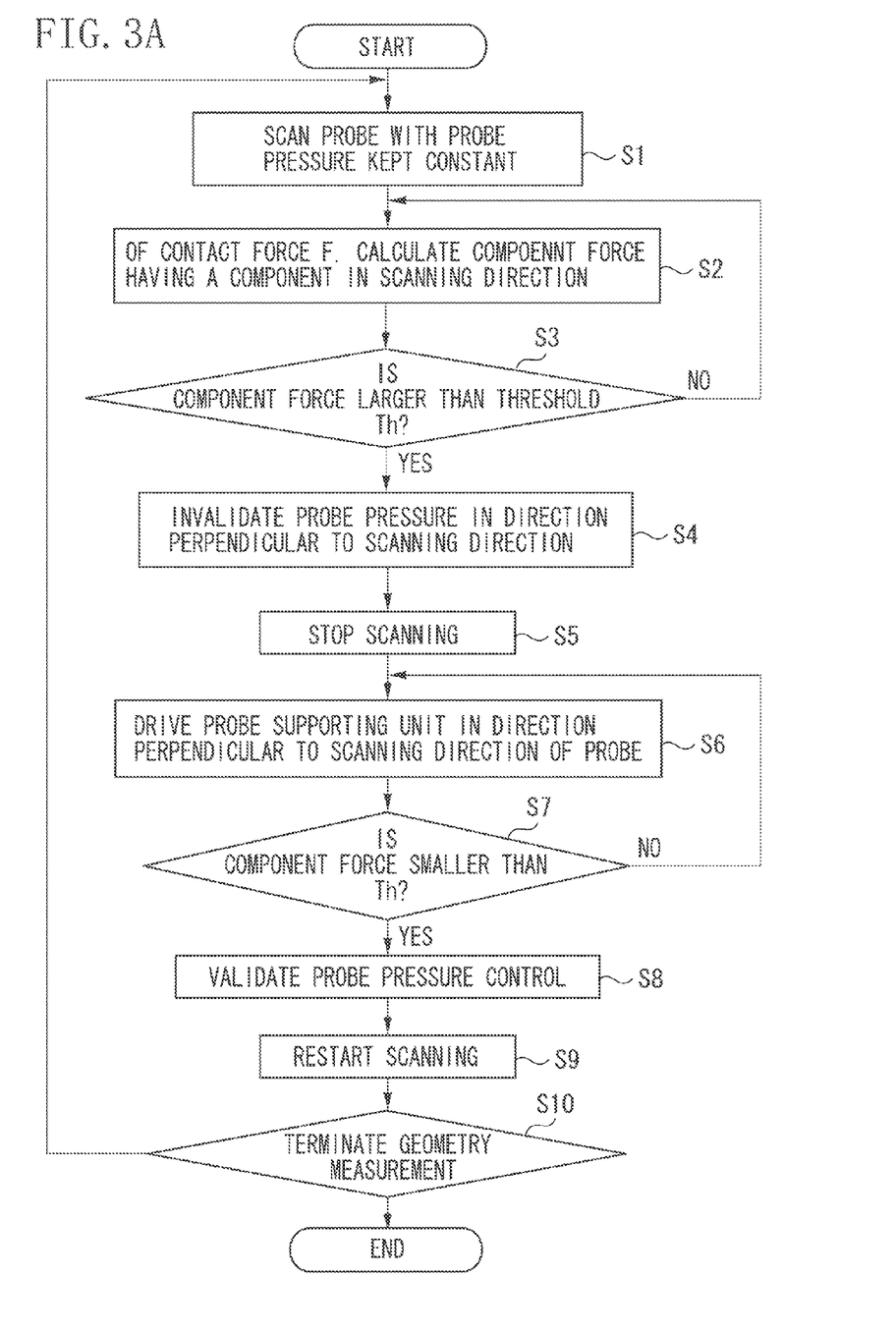
FIGS. 3A and 3B are configuration diagrams of the probe according to the second exemplary embodiment of the present invention.
Figure 3B:
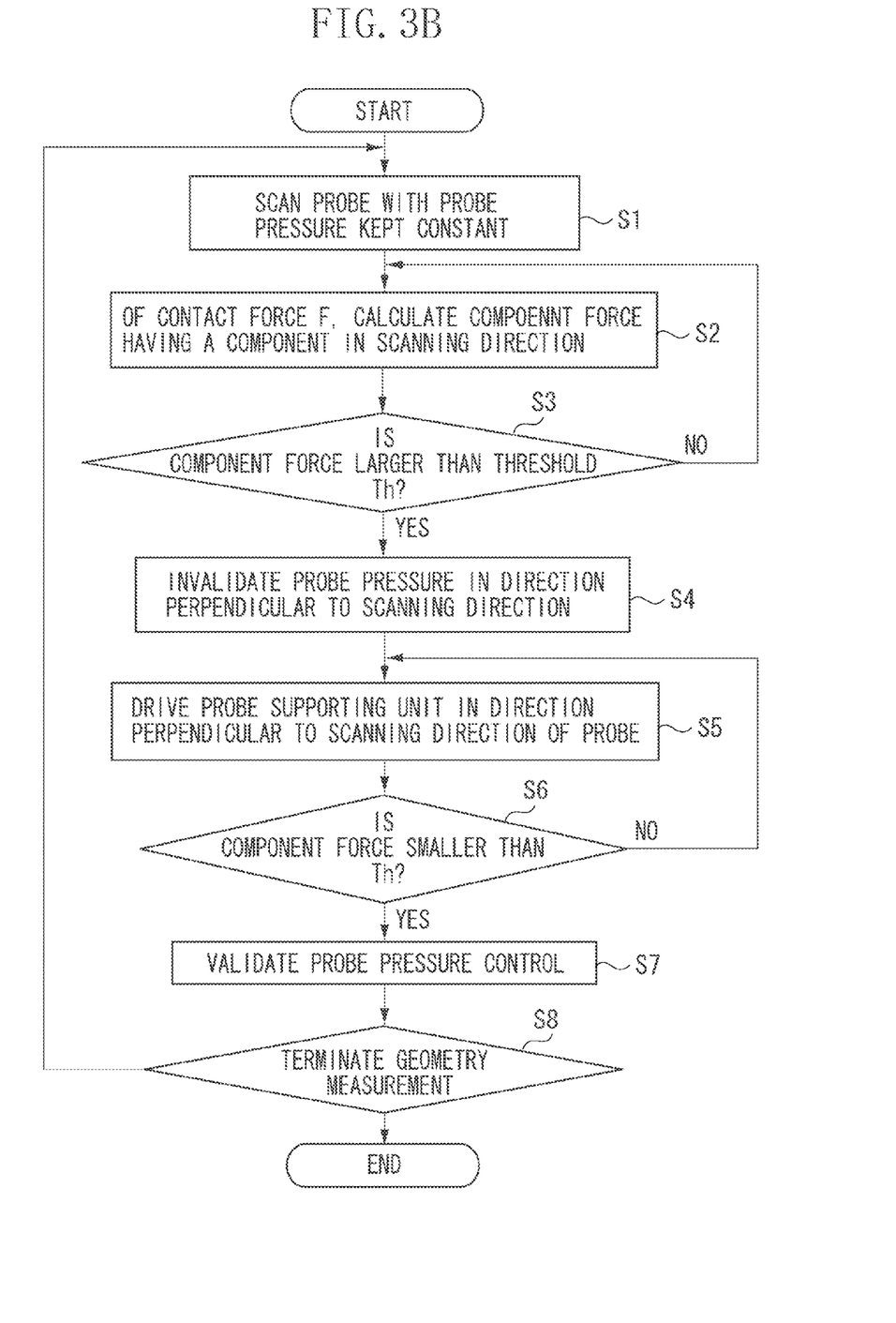

FIGS. 3A and 3B are flow charts illustrating an operation of the probe for measuring the shape of a measured object 4 by scanning the probe on the surface of the measured object 4 having a plane nearly perpendicular to the X-Y plane with the probe kept in contact with the surface.

First, FIG. 3A is described. In step S1 in FIG. 3A, the tip ball 21 of the probe is brought into contact with the measured object 4 and a contact force F generated at that time is obtained according to the position and orientation of the probe as described above. The probe is scanned while being controlled such that the contact force F to approach a target value Ft. This operation corresponds to controlling the probe pressure to approach a particular value.

In step S2, of the contact force F, a component force having a component in a moving direction of the probe supporting unit, namely, a scanning direction of the probe is calculated. This step corresponds to calculating Fxy which is a component in the scanning direction of the probe out of the contact force F. As evident from a force applied to the tip ball 21 located at positions P2 and P4 in FIG. 4, the component force has a positive component (P4) or a negative component (P2) with respect to the scanning direction. Obviously, the calculated component force does not need to be parallel to the scanning direction of the probe and any component force is permitted as long as it has a component in the scanning direction. The moving direction of the probe supporting unit is known from a scanning trajectory of the probe, preliminarily determined before the measurement of the shape for raster scanning is started.

In step S3, whether the component force is larger than a predetermined threshold Th is determined. A case where the component force (Fxy in the above example) is not larger than a threshold Th corresponds to a case where the component of a component force extending in a direction perpendicular to the probe scanning direction is large. Consequently, the probe can scan along the surface of the measured object 4 without forces generated by the position control and the contact force control accompanying the scanning of the probe cancelling out each other (this case is, for example, a state at position P3 in FIG. 4). In this case, by scanning the probe, a component force of the contact force F having a component in the scanning direction (a moving direction of the probe supporting unit) of the probe is calculated, and this value is compared with the threshold Th again.

In step S4, when the component force is larger than the threshold Fh, on a predetermined scanning trajectory, the probe cannot be moved in a direction perpendicular to a current scanning direction, and thus, the force control of a stylus pressure in the direction perpendicular to the scanning direction is invalidated. In this exemplary embodiment, the force control of the stylus pressure in the Z direction is invalidated. The invalidation of the force control is stopping the force control and more specifically, the invalidation can be achieved by turning a gain of an integrator accommodated in the contact force control unit 26 to zero.

When the component force Fxy exceeds the threshold Thxy, the probe supporting unit is driven in a direction perpendicular to the scanning direction of the probe, for example, in the Z direction to move the probe. In this case, a phenomenon that the stylus pressure in the Z direction decreases with a movement of the probe in the Z direction occurs. The reason is that the probe attempts to stay there with a friction force. Thus, to move the probe, the force control to make the stylus pressure in the Z direction constant is invalidated.

In step S5, the movement of the probe supporting unit is canceled to stop the scanning of the probe. In step S6, the probe supporting unit is driven in a direction perpendicular to the direction of the scanning trajectory of the probe currently in a stationary condition, in other words, the moving direction of the probe supporting unit, to displace the probe. The perpendicular direction described here is determined depending on which direction the displacement should be applied to the measured object 4 in viewpoints of the shape of the measured object 4. In case of a member having both a semispherical portion and a column portion, when the tip ball 21 is located at a position P1, a velocity or an acceleration having a component in the positive direction of the Z axis is provided to the probe supporting unit 17. Conversely, if a velocity or an acceleration is provided in the negative direction of the Z axis, there is a fear that the tip ball 21 of the probe may collide with a measuring base 3 and it is inconvenient. Because a schematic shape of the measured object 4 is known in most cases, it is permissible to preliminarily set in which direction the probe supporting unit should be moved.

In step S7, when the component force Fxy becomes smaller than the threshold Thxy after the probe is moved (YES in step S7), by "validating" controlling of the probe pressure in the Z direction to be constant, the probe can return to an operation at the time of scanning a gentle slope. This operation can be achieved by "validating" the force control again by setting the gain of the integrator previously set at 0 to other value than 0.

In step S8, after that, the scanning of the probe is restarted and the measurement of the shape of the measured object 4 is restarted. In step S9, whether the scanning of a target area of the measured object 4 has been terminated is determined and if it has been terminated (YES in step S10), the measurement is terminated and otherwise (NO in step S10), the processing returns to step S1.

When the probe moves while generating a component force exceeding the threshold, if the surface of the measured object 4 is perpendicular to the X-Y plane and then the probe supporting unit 17 continues to operate along the scanning trajectory, it comes that the probe continues to advance against the surface of the measured object 4, so that the stylus pressure continues to rise. Alternatively, when the probe moves downward along a steep slope, the probe leaves the surface of the measured object 4, so that the stylus pressure becomes zero and the probe floats in space.

Then, when the component force Fxy exceeds the threshold Thxy in the measurement of the shape illustrated in the flow chart of FIG. 3A, the driving of the probe supporting unit 17 in the direction of the scanning trajectory (for example, a current traveling direction for raster scanning) is canceled to stop the scanning of the probe. When the probe goes beyond the vertical section, by restarting the scanning with the probe supporting unit 17 in the direction of the scanning trajectory, the scanning with the probe along the surface of the measured object 4 can be achieved even if the measured object has a vertical surface.

When the measured object 4 has no steeply-inclined surface like a vertical plane, if the component force Fxy exceeds the threshold Thxy, it is permissible to omit a procedure for stopping and restarting the scanning operation like the shape measuring method illustrated in the flow chart of FIG. 3B. The shape measuring method illustrated in the flow chart of FIG. 3B is the same as that illustrated in the flow chart of FIG. 3A except that the steps of stopping and restarting the scanning with the probe supporting unit 17, indicated in steps S5 and S9 in FIG. 3A are omitted. This prevents the shape measurement from being stopped halfway due to erroneous determination and ensures a stabilized operation.

Here, it is permissible to apply hysteresis trigger which changes the value of Thxy between before and after Fxy reaches the Thxy. In this case, a vibrating action of the probe which occurs when Fxy changes in excess of Thxy can be blocked to execute a more stable scanning.

It is permissible to obtain any component parallel to the scanning trajectory by calculation instead of Fxy and execute the scanning the probe using the relation specified in the above equation 8. In this case, the probe becomes capable of escaping obliquely into an upward space containing any one of Z and XY by means of a forced displacement and the contact force control, so that a more stable scanning can be achieved. However, if a projection of the scanning trajectory onto the X-Y plane which the probe travels on becomes different from an initially provided scanning trajectory, and if it is intended to measure the shape strictly along the initially provided scanning trajectory, this method cannot be used.

Further, by comparing the magnitude of the contact force F with that of the component force Fxy, an inclination of a measured object surface which the probe makes contact with can be estimated. Particularly, if the contact force F and the component force Fxy are substantially equal to each other, it can be estimated that the measured object surface is a plane perpendicular to the X-Y plane. In such a case, by decelerating the scanning velocity in the X-Y direction of the probe or stopping the probe and then continuing to move the probe supporting unit 17 in a positive direction of the Z direction, a phenomenon that the probe advances against the vertical plane can be avoided. Consequently, even if the measured object has a steeply-inclined surface, for example, a wall surface vertical to the X-Y plane, the shape of the measured object can be measured stably by providing with only the scanning trajectory on the X-Y plane and without providing any scanning trajectory in the Z direction.

Figure 2:
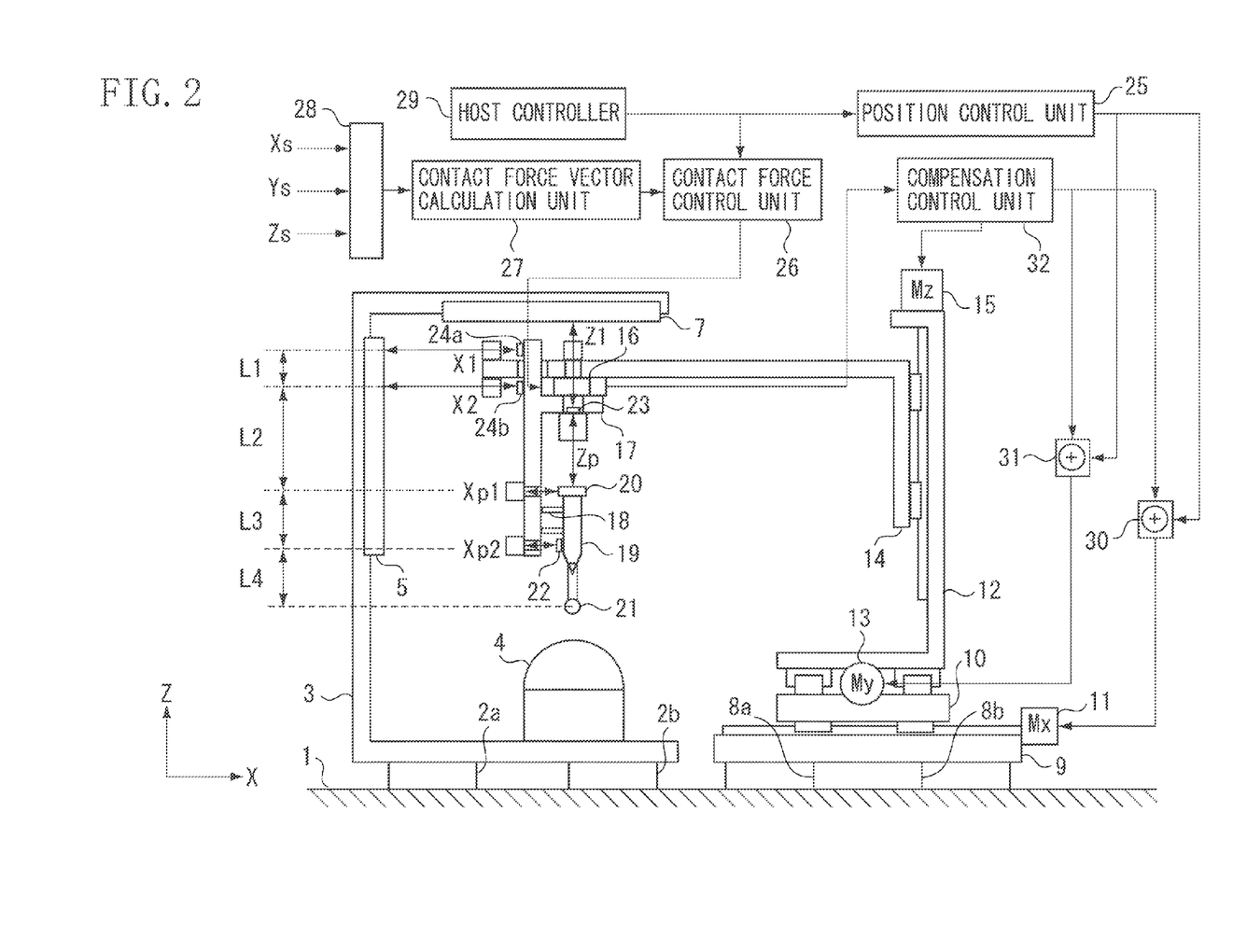
FIG. 2 is a configuration diagram of a probe according to a second exemplary embodiment of the present invention.

A second exemplary embodiment of the present invention will be described with reference to FIG. 2. Only a fine movement table 16 and a compensation control unit 32, which are not employed in the first exemplary embodiment, will be described. The fine movement table 16 is provided on the Z-axis slide 14 such that it is movable in the X, Y, Z directions. The probe supporting unit 17 is fixed on the fine movement table 16.

The control of the fine movement table 16 will be described. The fine movement table 16 which can be inched in the 3-dimensional direction is related to only the control of the contact force but not related to the position control of the probe. The contact force F is kept constant by controlling the fine movement table 16 in the X, Y, Z directions and a movement of the fine movement table 16 in the Z direction is compensated by controlling the Z-axis slide 14. Specifically, an output of the fine movement table 16 is input to the compensation control unit 32 and the Z-axis motor 15 is controlled so that the movement amount in the Z direction turns to zero when moving the Z-axis slide 14. As a result, an effect of compensating for a stroke of the fine movement table 16 is generated. This fine movement table 16 may have an effect of improving a control band of the Z-axis containing the Z-axis slide 14 by employing a table having a driving unit capable of responding rapidly such as a piezo actuator.

If the Z-axis control band can be improved in this way, when a force by the position control and a force by the contact force control cancel out each other, so that the scanning of the probe is disabled, the probe can be moved more rapidly. Consequently, if the position control and the contact force control cancel out each other when executing a rapid scanning, saturation of the contact force control can be prevented, thereby achieving a measurement of the shape having few errors and a small deviation in the contact force. Further, according to this exemplary embodiment, the contact force control is carried out by only the fine movement table 16, so that no influence by the contact force control is applied to the X and Y slides each. Thus, the probe can be scanned on the measured object 4 strictly following an initially provided scanning trajectory.

Although the first exemplary embodiment and the second exemplary embodiment have been described above by taking a laser measuring machine as a unit configured to measure the position and orientation of the probe like Xp1, the same effect can be secured even if other measuring unit, for example, a electrostatic capacitance displacement gauge, an eddy current displacement gauge, is employed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-028716 filed Feb. 14, 2011, which is hereby incorporated by reference herein in its entirety.

What is claimed is:

1. A shape measuring apparatus for measuring a shape of a measured object by scanning a contact type probe along the surface of the measured object while keeping the contact type probe in contact with the measured object and measuring a position of the contact type probe, the shape measuring apparatus comprising:
- a probe supporting unit configured to be movable in a three-dimensional direction;
- a contact type probe configured to be supported elastically with respect to the probe supporting unit;
- a measuring unit configured to measure the position and orientation of the contact type probe; and
- a calculation unit configured to calculate a contact force received by the contact type probe from the measured object based on a measured position and orientation of the contact type probe,
- wherein the probe supporting unit is configured, when a component force containing a component in a moving direction of the probe supporting unit of the contact force exceeds a predetermined threshold, to be driven in a direction perpendicular to the moving direction of the probe supporting unit to move the contact type probe.

2. The shape measuring apparatus according to claim 1, wherein the probe supporting unit is configured to be driven by providing the probe supporting unit with a speed or an acceleration proportional to a difference between the component in the moving direction of the probe supporting unit and the threshold.

3. The shape measuring apparatus according to claim 1, wherein the probe supporting unit further comprises:
- a slide movable in a 3-dimensional direction; and
- a table supported by the slide movably in a 3-dimensional direction with respect to the slide,
- wherein, the contact force magnitude is configured to be brought close to a target value by moving the table to move the position of the contact type probe.

4. A shape measuring method for measuring the shape of a measured object by scanning a contact type probe supported elastically by a probe supporting unit movable in a 3-dimensional direction along the surface of the measured object while keeping the contact type probe in contact with the measured object and measuring a position of the contact type probe, the shape measuring method comprising:
- measuring the position and orientation of the contact type probe and calculating a contact force based on the measured position and orientation of the contact type probe;
- scanning the surface of the measured object with the contact type probe by moving the probe supporting unit while controlling the contact force to be brought close to a target value with a force control unit; and
- driving the probe supporting unit in a direction perpendicular to the moving direction of the probe supporting unit to move the contact type probe, when a component force containing a component in a moving direction of the probe supporting unit of the contact force exceeds a predetermined threshold.

5. The shape measuring method according to claim 4, wherein the probe supporting unit is configured to be driven by providing the probe supporting unit with a speed or an acceleration proportional to a difference between the component in the moving direction of the probe supporting unit and the threshold.

* * * * *